Jan. 20, 1953  C. M. STEELY  2,625,909
VACUUM BRAKE FOR MOTOR TRUCKS
Filed May 25, 1950  3 Sheets-Sheet 2
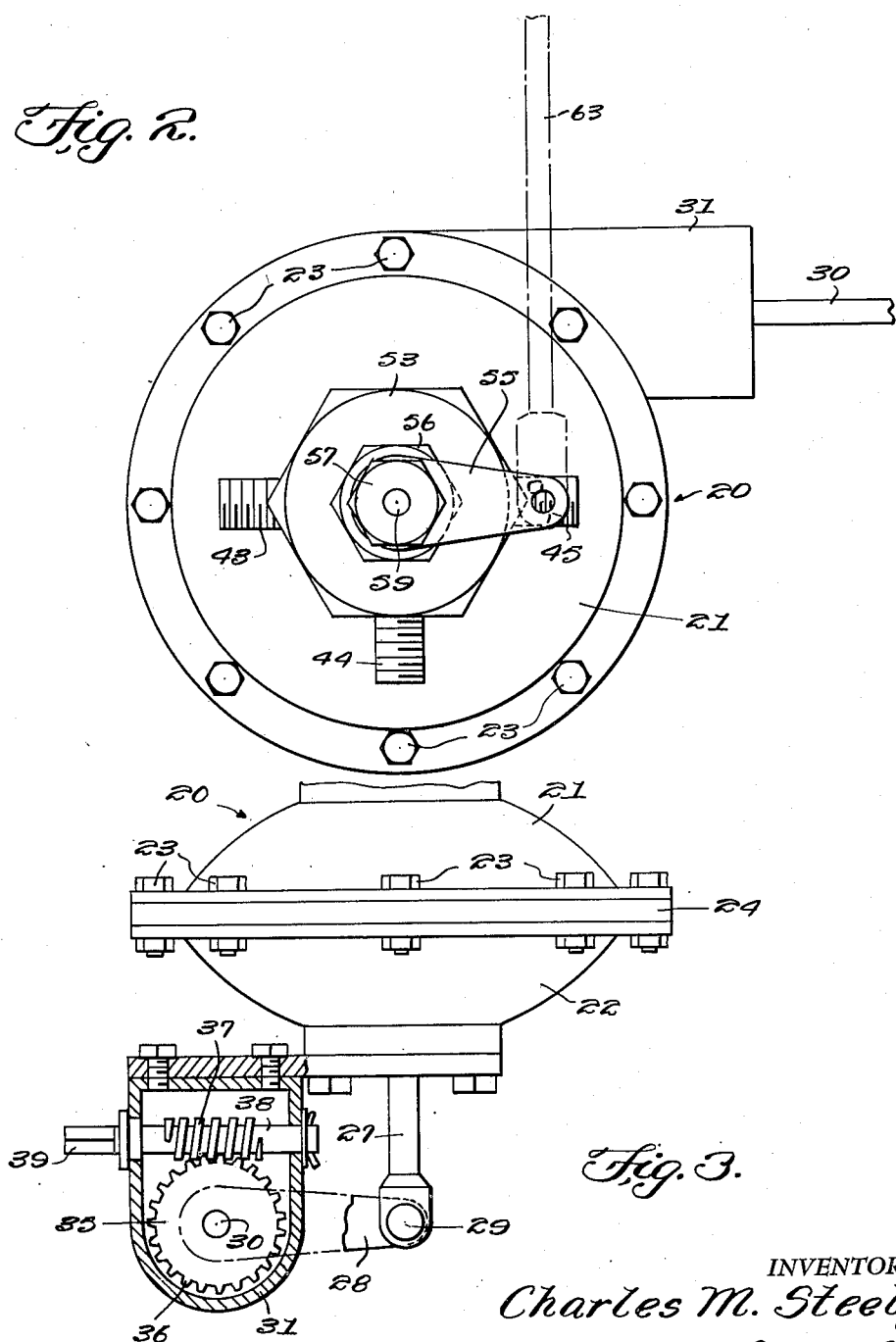
INVENTOR.
Charles M. Steely,
BY Victor J. Evans & Co.
ATTORNEYS

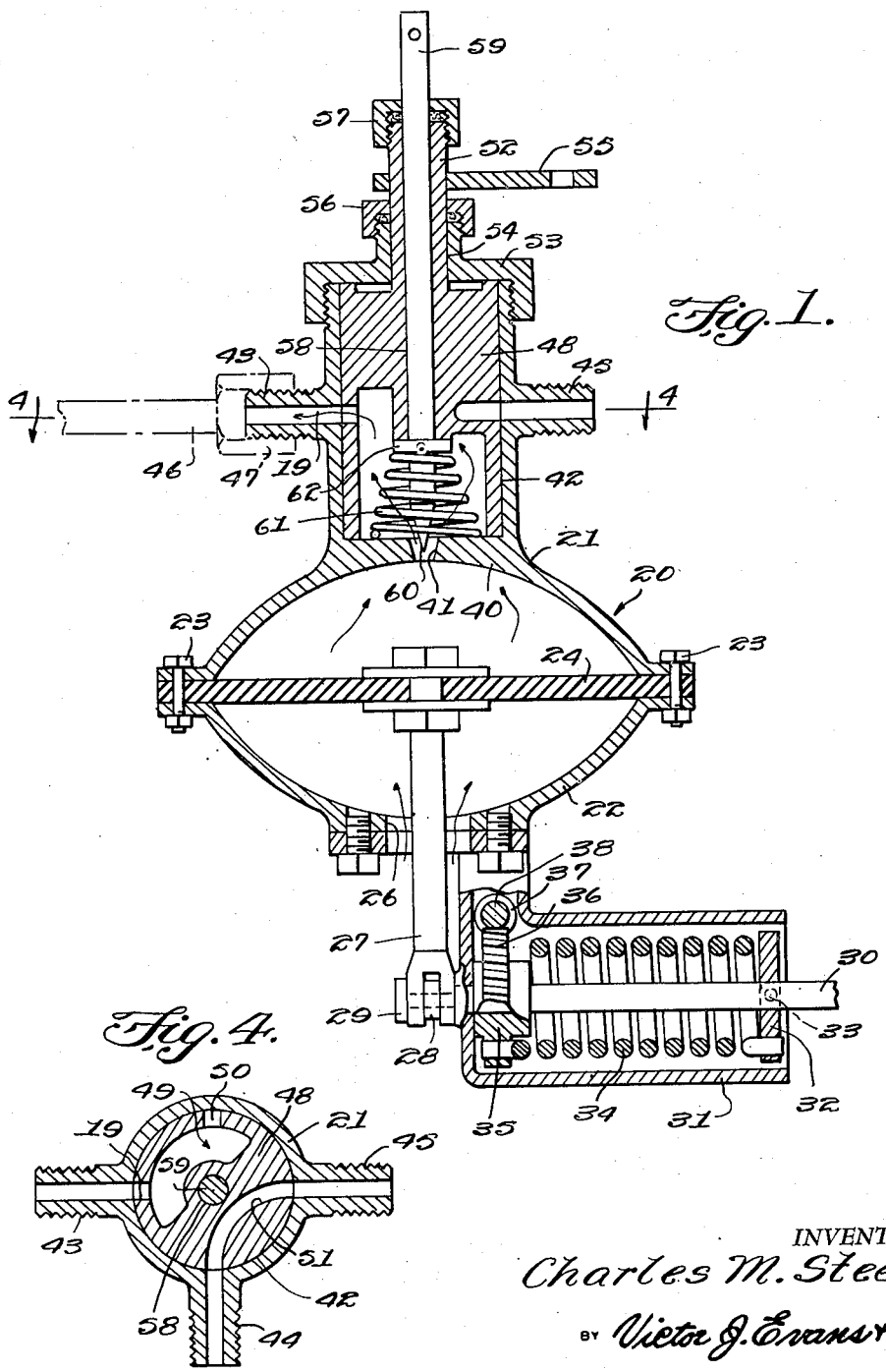

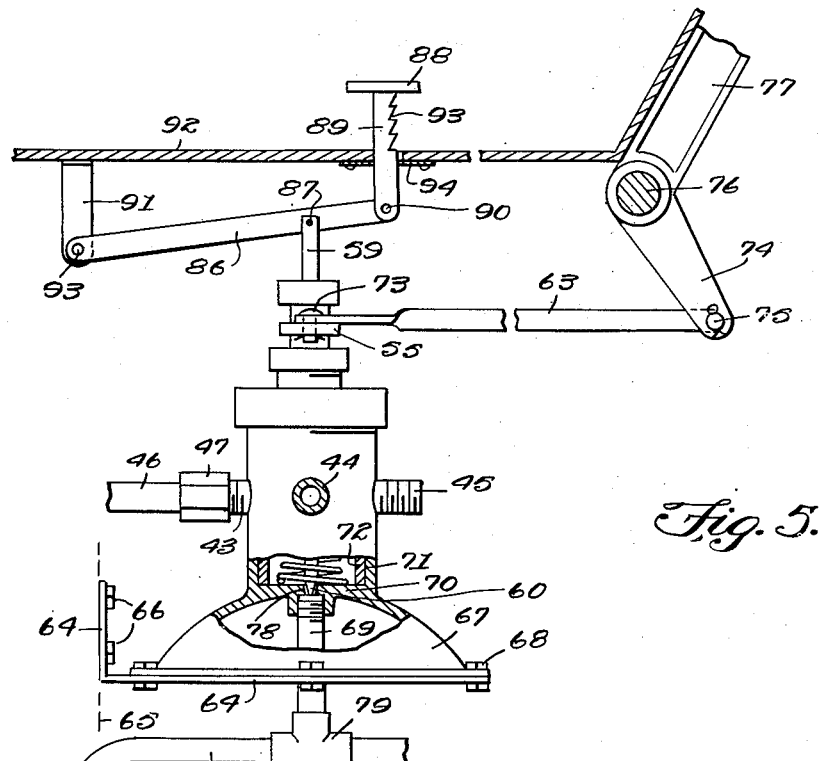
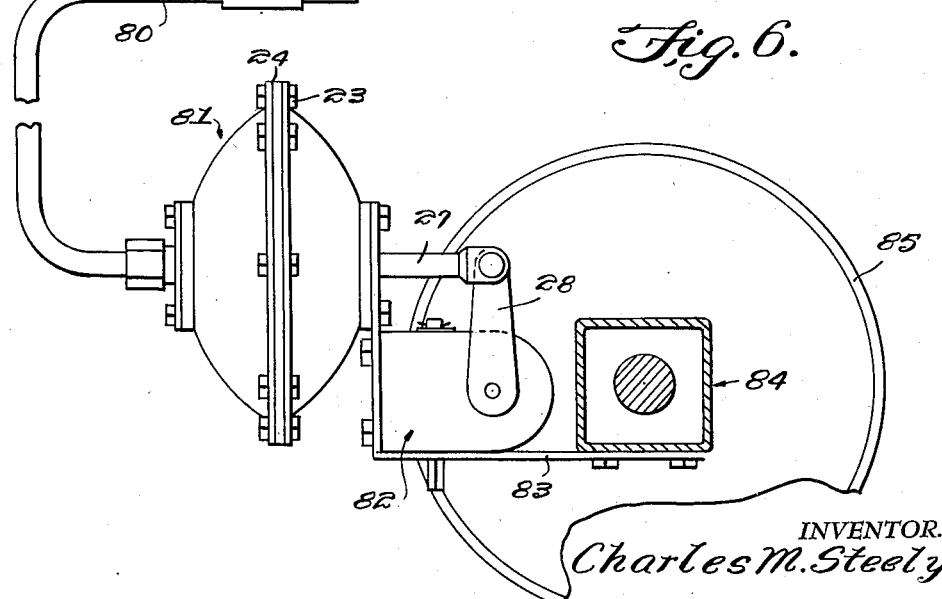

Patented Jan. 20, 1953

2,625,909

UNITED STATES PATENT OFFICE 2,625,909

VACUUM BRAKE FOR MOTOR TRUCKS

Charles M. Steely, Hamburg, Pa.

Application May 25, 1950, Serial No. 164,100

3 Claims. (Cl. 121—38)

This invention relates to motor vehicles, and more particularly to a mechanism for operating the brakes of the vehicle.

The object of the invention is to provide a brake system for a vehicle wherein the brakes will be positively applied to the vehicle wheels upon actuation of the mechanism, the mechanism preventing the brakes from being unlocked unless the vehicle engine is started, or unless the mechanism is manually adjusted.

Another object of the invention is to provide a brake-operating means that will immediately lock the brakes upon the occurrence of a leak, break, or the like, in the system.

Still another object of the invention is to provide a brake-operating means which can be used as an emergency brake at the will of the vehicle operator, the brake-operating mechanism of the present invention serving to prevent a vehicle from being operated with unsafe brakes, since the brakes will not release when the system is not air or vacuum proof.

A further object of the invention is to provide a vehicle brake system which is extremely simple and inexpensive to manufacture.

Other objects and advantages will be apparent during the course of the following description.

In the accompanying drawings forming a part of this application, in which like numerals are used to designate like parts throughout the same:

Figure 1 is a vertical sectional view taken through the brake mechanism of the present invention;

Figure 2 is a top plan view of the assembly of Figure 1;

Figure 3 is a side elevational view of the brake mechanism with parts broken away and in section;

Figure 4 is a sectional view taken on the line 4—4 of Figure 1;

Figures 5 and 6 are fragmentary side elevational views, with parts broken away and in section, of a modified brake-operating mechanism.

Referring in detail to Figures 1 through 4 of the drawings, the numeral 20 designates a housing which includes an upper section 21 and a lower section 22, the sections 21 and 22 being detachably connected together by a plurality of securing elements, such as bolt-and-nut assemblies 23, Figure 1. Interposed between the upper section 21 and the lower section 22 is a resilient diaphragm 24.

The lower section 22 is provided with an opening 26, and projecting through the opening 26 is a rod 27, the rod 27 having its upper end secured to the diaphragm 24. The lower end of the rod 27 is pivotally connected to a link 28, Figure 3, by a pin 29, while the other end of the link 28 is secured to a shaft 30. The shaft 30 is adapted to be connected to a suitable conventional cam which forms part of the braking system of a vehicle, such as a truck, so that as the shaft 30 is rotated, the cam will turn to thereby force the brake shoes into engagement with the brake drum, whereby the brakes will be applied to the wheels of the vehicle.

The shaft 30 extends longitudinally through a hollow casing 31 which is arranged adjacent to the housing 20, and the shaft 30 is rotatably supported in the casing. Arranged adjacent to one end of the casing 31 is a plate 32, the plate 32 being secured to the shaft 30 by a suitable set screw 33, Figure 1. Circumposed on the shaft 30 is a coil spring 34, and one end of the coil spring 34 is connected to the plate 32. The other end of the coil spring 34 is connected to a gear wheel 35, the gear wheel 35 being loosely mounted on the shaft 30. The gear wheel 35 is provided with a plurality of teeth 36 that mesh with a spiral or worm 37, the worm 37 being arranged on a shaft 38 which extends transversely through the casing 31 and is rotatably supported thereby. One end of the shaft 38 is provided with a tool-engaging portion 39, whereby the shaft 38 is adapted to be adjusted or rotated so as to adjust the tension on the coil spring 34. Normally, the coil spring 34 tends to maintain the brakes in their "on" position with respect to the wheels, but when a source of vacuum pressure is supplied to the housing 20, the rod 27 will be raised, to thereby rotate the shaft 30 against the tension of the coil spring 34 in order to release the brakes from the wheels.

Arranged in the upper section 21 is a partition 40 which is provided with a tapered opening or port 41, Figure 1. The partition 40 coacts with the upper end of the section 21 to define a chamber 42. A plurality of spaced, exteriorly threaded, hollow bushings 43, 44 and 45 project from the upper section 21, and each of these bushings communicates with the interior of the chamber 42. A suitable conduit 46 (broken lines) is adapted to be detachably connected to the bushing 43 by a nut 47, and the conduit 46 is adapted to be connected to the engine or vehicle manifold, whereby vacuumatic pressure can be supplied to the chamber 42 through the opening 41, whereby upward movement of the diaphragm 24 can be effected.

Rotatably arranged in the chamber 42 is a valve 48, the valve 48 being provided with a large recess or cutout 49, Figure 4. The valve 48 is further provided with a port 50 which communicates with the recess 49. Also, there is an arcuate passageway 51 arranged in the valve 48 for a purpose to be later described. Thus, by properly rotating or positioning the valve 48 in the chamber 42, vacuum or air can be supplied to the upper section 21.

Projecting upwardly from the valve 48, or formed integrally therewith, is a sleeve or body portion 52, the body portion 52 projecting through a central opening 54 in a cap 53. The cap 53 is threadedly connected to the upper end of the housing 20. A suitable lever 55 is arranged in engagement with the body portion 52 and when the lever 55 is rotated, the body portion 52 and valve 48 will also be rotated, so that the passageway 51 and port 50 can be arranged in registry with any of the bushings desired.

A nut 56 is detachably connected to the top of the cap 53, while a smaller nut 57 is detachably connected or threadedly connected to the upper end of the body portion 52, these nuts serving to insure that there is a fluid-tight seal between the moving parts.

The valve 48 is provided with a longitudinally extending bore 58, and a rod 59 slidably or reciprocably projects through the bore 58. The rod 59 has its lower end shaped to define a pointed end or tip 60, and the tip 60 is mounted for movement into and out of bridging relation with respect to the opening 41 in the partition 40. Circumposed on the rod 59 is a helical spring 61, the spring 61 being interposed between the partition 40 and a collar 62 which is secured to the rod 59. The helical spring 61 serves to normally urge the rod 59 out of bridging or closing relation with respect to the opening 41. By means of the rod 59, the condition or position of the diaphragm 24 can be maintained immobile. Thus, by moving the tip 60 into bridging or closing relation with respect to the opening 41 at such times as the diaphragm 24 is being pulled upwardly by vacuum in the section 21, the diaphragm 24 will be maintained immobile or stationary in this position. For causing turning movement of the lever 55, a bar 63 (broken lines), Fig. 2, is provided, and the bar 63 may be connected to the brake pedal of the vehicle, such as a truck.

The apparatus shown in Figures 1 through 4 is used as follows: The coil spring 34 will normally maintain the conventional cam of the vehicle in a position so that rotation of the wheels of the vehicle is prevented. Then, to permit normal rotation of the vehicle wheels, the vehicle engine must be started and also the rod 48 is rotated by a suitable means, such as the lever 55 which may be connected to a foot pedal in the vehicle. The valve 48 is rotated to the position shown in Figure 4, whereby the vacuum is directed through the conduit 46 from the engine manifold, then through the hollow bushing 43, then through the port 19 in the valve 48, next through the recess 49, and finally through the opening 41, so that the resilient diaphragm 24 will be flexed upwardly. This upward movement of the diaphragm 24 causes the rod 27 to be raised upwardly, whereby the leg 28 will be pivoted to thereby rotate the shaft 30 against the force of the spring 34. This rotation of the shaft 30 causes movement of the cam of the brake assembly so that the wheels of the vehicle will be free to rotate.

The tension of the coil spring 34 can be adjusted by rotating the shaft 38, the shaft 38 being provided with wrench-engaging faces 39. Thus, rotation of the shaft 38 causes rotation of the gear wheel 35, since the worm 37 and teeth 36 are maintained or arranged in meshing engagement with each other. Normally, the rod 59 is in the raised position shown in Figure 1, the rod 59 being urged into this position by means of the helical spring 61. Thus, vacuum pressure can pass freely through the opening 41. However, the rod 59 can be lowered in the bore 58 by means of a foot pedal, such as the foot pedal 88, so that the tip 60 closes the opening 41, whereby the diaphragm 24 will remain immobile in whatever position it happens to be. It will be noted that the valve 48 can be rotated from the position shown in Figure 4, so that air can flow through the bushing 45, through the ports 19 or 50 into the recess 49, and thence through the opening 41, whereby the diaphragm 24 can be released, so as to permit the brakes of the vehicle to be unlocked. Also, the bushing 44 can be connected by suitable conduits to trailer brakes or other independent brakes in the vehicle.

Referring to Figures 5 and 6 of the drawings, there is shown a modified brake-operating mechanism. In Figures 5 and 6, the numeral 64 designates an L-shaped bracket which is adapted to be secured to any part of a vehicle or frame 65 by suitable securing elements, such as bolt-and-nut assemblies 66. A hollow, arcuate base 67 is secured to the bracket 64 by bolt-and-nut assemblies 68, and a conduit 69 projects through the base 67. Arranged adjacent the upper portion of the base 67 is a partition 70 which defines a chamber 71 and a valve 72 is rotatably arranged in the chamber 71. The valve 72 has the same construction as the previously-described valve 48. For rotating the valve 72, the lever 55 is again connected to the upper end thereof, and the bar 63 is pivotally connected to the lever 55 by a pin 73. The other end of the bar 63 is pivotally connected to a link 74 by a pin 75, and a shaft 76 connects the link 74 to the brake or foot pedal 77. Thus, upon depression of the member 77 by the vehicle operator, the valve 72 can be selectively rotated in order to control the flow of air or vacuum into the pipe or conduit 69. An opening 78 is arranged in the partition 70, and the tip 60 of the rod 59 is again adapted to move into and out of bridging relation with respect to the opening 78.

A T-fitting 79 is connected to the lower end of the pipe 69, and communicating or connected with the T-fitting 79 is a conduit 80, the conduit 80 being arranged in communication with one end of a housing 81. Arranged in the housing 81 is a diaphragm 24 which functions in the same manner as the diaphragm described in connection with the structure of Figures 1 through 4. The diaphragm 24 is connected to a rod 27 so that as the diaphragm 24 is moved by air pressure or vacuum, the rod 27 will be reciprocated, and the rod 27 is pivotally connected to a link 28. The link 28 is operatively connected to a conventional cam assembly 82 which is supported on a bracket 83. The bracket 83 is secured to the vehicle axle 84. Movement of the link 28 causes the cam of the cam assembly 82 to move the brake shoes into engagement with the brake drum 85, so as to apply the brakes to the vehicle upon proper setting of the valve 72.

For moving the tip 60 into closing relation with respect to the opening 78 in the partition 70, a foot pedal 88 is provided. The foot pedal 88 is mounted on the upper end of a bar 89, and the lower end of the bar 89 is pivotally connected to one end of the arm 86 by a pin 90. A pin 87 pivotally connects the arm 86 to the upper end of the rod 59. A bracket 91 is secured to the bottom of the floor board 92 of the vehicle, and a pin 93 pivotally connects one end of the arm 86 to the bracket 91. The bar 89 is provided with a plurality of teeth 93 which are adapted to engage with a plate 94 that is secured to the bottom of the floor board 92, whereby the foot pedal 88 or rod 59 can be maintained immobile in its various adjusted positions.

Referring to Figures 5 and 6 of the drawings, there is shown a modified brake-operating mechanism which operates substantially in the same manner as the mechanism of Figures 1 through 4. Thus, the valve 72 can be rotated by means of the member 77 which is connected to the valve 72 by means of the links 63 and 74. The valve 72 can be arranged so that vacuum pressure goes through the conduit 46, then through the bushing 43, then through the valve 72, then through openings 78, and into pipe or conduit 69. This vacuumatic pressure will consequently be exerted through the pipe or conduit 80, and this will cause flexing of the diaphragm 24 in the housing 81. This flexing or movement of the resilient diaphragm 24 results in reciprocation of the rod 27 and this causes movement of the link 28, whereby the cam of the cam assembly 82 will be actuated and thereby permit rotation of the wheel. The rod 59 can be moved so that its tip 60 closes the opening 78 in the partition 70, whereby the diaphragm 24 will be maintained immobile. This depression of the rod 59 is caused by the foot pedal 88, the teeth 93 serving to maintain the foot pedal 88 stationary in its adjusted position. Also, the valve 72 can be rotated in order to permit air to enter the housing 81, whereby the diaphragm 24 can return to its normal position so as to again permit locking of the brakes.

The brake-operating mechanism of the present invention is trouble free, will not freeze in cold weather and will not readily get out of order. The mechanism can be readily adapted to existing parts in a vehicle, such as a truck. The mechanism of the present invention is extremely safe, because the truck brakes will not be released if the system is leaking in any place. In other words, the system must be air-tight or vacuum-proof. Also, the vehicle engine must be started before the brakes can be released, since vacuum has to be generated in the engine manifold.

I claim:

1. In a brake system, a hollow housing including an upper section and a lower section connected to said upper section, an annular resilient diaphragm interposed between said upper and lower sections and connected thereto, a rod having one end connected to said diaphragm and projecting through said lower section, a casing arranged exteriorly of said housing, a shaft rotatably mounted in said casing, a link having one end pivotally connected to said rod and its other end connected to said shaft whereby movement of said diaphragm causes rotation of said shaft, a partition arranged in said upper section and defining a chamber, there being bushings communicating with said chamber, a valve rotatably arranged in said chamber and provided with ports adapted to register with said bushings, the upper end of said valve projecting beyond said upper section and defining a body member, a lever having one end connected to said body member for rotating said valve, there being an opening in said partition, said valve being provided with a longitudinally extending bore, a rod reciprocably arranged in said bore and mounted for movement into and out of bridging relation with respect to the opening in said partition.

2. The apparatus as described in claim 1, and further including a coil spring for normally urging said rod out of bridging relation with respect to said opening in the partition.

3. The apparatus as described in claim 1, and further including a coil spring circumposed on said shaft and positioned in said casing.

CHARLES M. STEELY.

REFERENCES CITED

The following references are of record in the file of this patent:

UNITED STATES PATENTS

| Number | Name | Date |
| --- | --- | --- |
| 1,905,984 | Hill | Apr. 25, 1933 |
| 2,059,069 | Weiss | Oct. 27, 1936 |
| 2,126,849 | Weiss | Aug. 16, 1938 |